A. BOGDANSKI.
CHURN.
APPLICATION FILED AUG. 2, 1922.

1,436,642.

Patented Nov. 28, 1922.
2 SHEETS—SHEET 1.

Inventor
Alexander Bogdanski
By
Frank C. Curtis
Attorney

A. BOGDANSKI.
CHURN.
APPLICATION FILED AUG. 2, 1922.

1,436,642.

Patented Nov. 28, 1922.
2 SHEETS—SHEET 2.

Inventor
Alexander Bogdanski
By
Frank C. Curtis
Attorney

Patented Nov. 28, 1922.

1,436,642

UNITED STATES PATENT OFFICE.

ALEXANDER BOGDANSKI, OF COHOES, NEW YORK.

CHURN.

Application filed August 2, 1922. Serial No. 579,123.

*To all whom it may concern:*

Be it known that I, ALEXANDER BOGDANSKI, a citizen of Poland, residing at Cohoes, in the county of Albany and State of New York, have invented new and useful Improvements in Churns, of which the following is a specification.

Reference may be had to the accompanying drawings, and the reference characters marked thereon, which form a part of this specification. Similar characters refer to similar parts in the several figures therein.

The principal object of the invention is to facilitate the consolidation and removal of the solid product resulting from a churning operation such as the making of butter or ice-cream.

Other objects will appear in connection with the following description.

Fig. 1 of the drawings is a central vertical section of a churn or ice-cream freezer embodying my invention.

Figure 1:
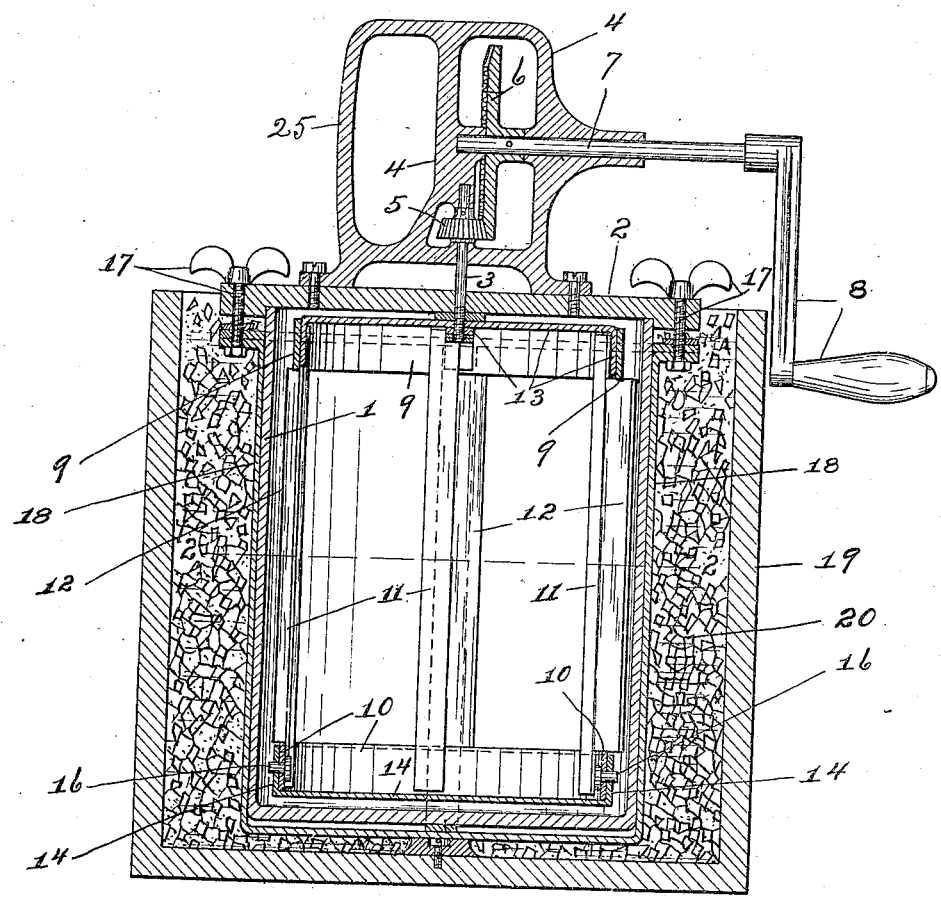
Figure 2:
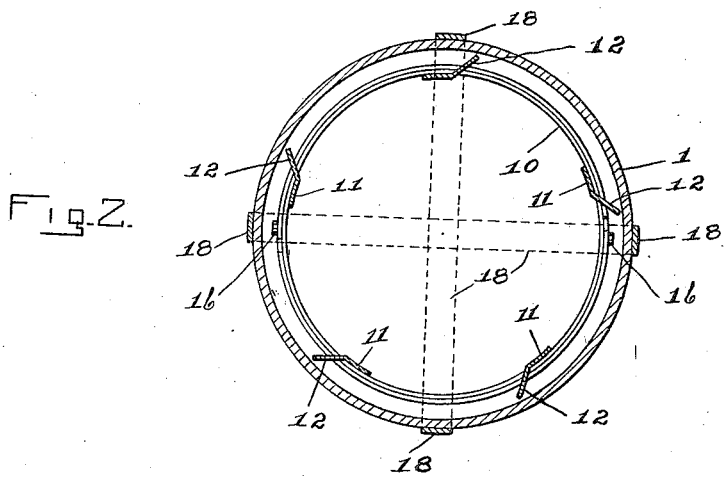
Fig. 2 is a horizontal cross-section of the same taken on the broken line 2—2 in Fig. 1.
Figure 3:
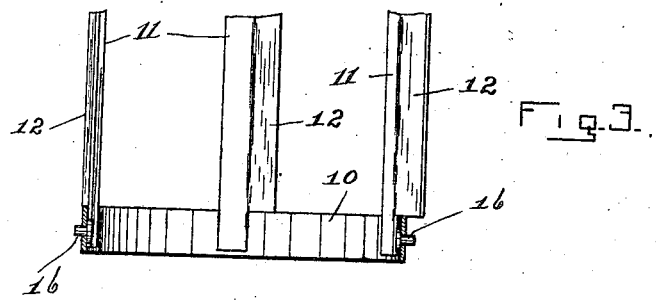
Fig. 3 is a central vertical section of a broken-away lower end portion of the churning-frame.
Figure 4:
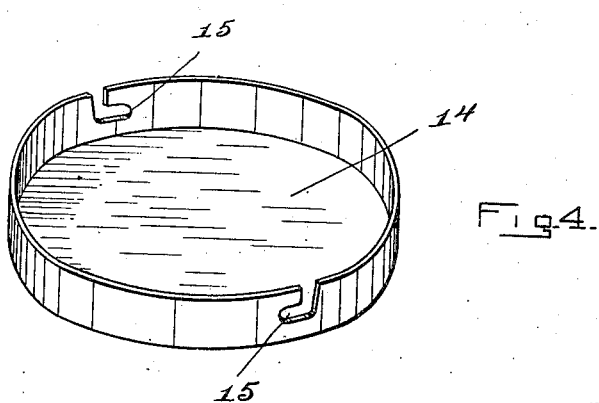
Fig. 4 is a view in perspective of the detachable pan for closing the bottom of the frame.

Referring to the drawings wherein the invention is shown in preferred form, 1 is a container of cylindrical form which may be made of any desired material such for example, as is ordinarily used for churns, ice-cream-freezers and the like.

The container is open at the top and provided with a cover, 2, upon which is rotatively mounted a vertical shaft, 3, having bearings in the bracket, 4, fixed upon the top.

The shaft, 3, may be rotated in any known manner as by means of a beveled pinion, 5, on the shaft engaged by a beveled gear, 6, fixed upon a horizontal shaft, 7, rotatively mounted in bearings in said bracket, 4, and adapted to be operated by a crank-handle, 8.

Within the container, 1, is a churner-frame comprising an upper annular member, 9, and a lower annular member, 10, connected together at intervals by vertical vanes, 11, each having a surface, 12, inclined toward the center of the frame with respect to the direction within which the frame is rotated.

The outer edges of these vanes are in close proximity to the interior surface of the container, 1.

The upper annular member, 9, is carried by a spider, 13, fixed upon the vertical shaft, 3, whereby the churner-frame rotates in unison with said shaft.

Detachably mounted upon the lower annular member, 10, is a pan, 14, which forms a bottom for the churner-frame.

This pan may be detachably mounted in any known manner upon the churner-frame.

I have shown the pan formed with two bayonet slots, 15, adapted to engage pins, 16, projecting outwardly from the lower annular member, 10

The operation of the device is as follows:

The pan, 14, is secured to the lower annular member, 10, by a bayonet movement whereby the pins, 16, are seated in the bayonet slots, 15.

The liquid to be churned is placed within the container, 1, and the cover is applied thereto with the churner-frame extending down into the container. The cover may be secured upon the container in any known manner as by bolts and nuts, 17, said bolts projecting upwardly through holes in the cover from a cage, 18, within which the container, 1, rests.

The churning-frame is then rotated by means of the crank-handle, 8.

If the operation is the churning of cream to make butter, the particles of butter as formed will be engaged by the oblique surfaces on the vanes, 11, and forced toward the center of the frame.

As the churning operation proceeds these particles of butter will adhere to one another and form a substantially solid mass of butter within the frame resting upon the pan, 14.

When the churning operation has been completed the fastenings of the cover of the container are released, whereupon the cover and churner-frame with the body of butter can be removed from the container, 1, the body of butter being supported by the pan.

The pan can then be detached from the churner-frame by a reversed bayonet movement and the churner-frame removed leaving the butter upon the pan.

In a similar manner in making ice cream, as the cream solidifies upon or adjacent to the inner side of the container, it is scraped or removed therefrom by the vanes and forced toward the center of the churner-frame, and deposited upon the bottom pan in much the same way that the butter is deposited in the butter-churning operation.

The solidified product is removed from the container and left deposited upon the pan in the same manner as in the case of butter above described.

In making ice-cream, the container, 1, and its cage, 18, are placed within a receptacle, 19, containing cracked ice and salt, 20.

25 is a handle, formed as part of the frame, 4, by means of which the cage, 18, and the parts mounted thereupon may be removed from the receptacle.

What I claim as new and desire to secure by Letters Patent is—

1. In a device of the class described and in combination, a container; a churner-frame rotatively mounted within the container, and having circumferentially disposed oblique vanes, said frame being open at the bottom; and a pan detachably secured to the lower end of the frame closing the bottom opening thereof.

2. In a device of the class described and in combination, a container; a churner-frame rotatively mounted within the container, said frame having annular top and bottom members connected together at intervals by vertical vanes having surfaces inclined toward the center of the frame; and a pan detachably secured to the lower annular member to form a bottom therefor.

3. In a device of the class described and in combination, a container; a cover for the container; a vertical shaft rotatively mounted upon said cover; means mounted upon the cover for rotating said shaft; a churner-frame within the container, said frame having upper and lower annular members, said upper annular member being fixedly mounted upon said shaft, and said annular members being connected at intervals by vanes having surfaces inclined toward the center of the frame; and a pan detachably secured to the lower annular member to form a bottom therefor.

In testimony whereof, I have hereunto set my hand this 26th day of July, 1922.

ALEXANDER BOGDANSKI.